US008002619B2

(12) United States Patent
Gagner et al.

(10) Patent No.: US 8,002,619 B2
(45) Date of Patent: Aug. 23, 2011

(54) AUGMENTED REALITY WAGERING GAME SYSTEM

(75) Inventors: Mark B. Gagner, West Chicago, IL (US); Mark C. Pace, Palatine, IL (US); Craig J. Sylla, Round Lake, IL (US)

(73) Assignee: WMS Gaming Inc., Waukegan, IL (US)

( * ) Notice: Subject to any disclaimer, the term of this patent is extended or adjusted under 35 U.S.C. 154(b) by 321 days.

(21) Appl. No.: 12/160,188

(22) PCT Filed: Jan. 5, 2007

(86) PCT No.: PCT/US2007/000375
§ 371 (c)(1),
(2), (4) Date: Jul. 7, 2008

(87) PCT Pub. No.: WO2007/081856
PCT Pub. Date: Jul. 19, 2007

(65) Prior Publication Data

US 2009/0088243 A1 Apr. 2, 2009

Related U.S. Application Data

(60) Provisional application No. 60/743,097, filed on Jan. 5, 2006.

(51) Int. Cl.
*A63F 13/00* (2006.01)

(52) U.S. Cl. ............................... 463/12; 463/11; 463/13

(58) Field of Classification Search .................... 463/12, 463/16, 25, 20; 273/149 R; 345/8
See application file for complete search history.

(56) References Cited

U.S. PATENT DOCUMENTS 5,356,140 A * 10/1994 Dabrowski et al. ............. 463/12
5,651,548 A 7/1997 French et al.
6,015,344 A * 1/2000 Kelly et al. ..................... 463/16
6,302,790 B1 10/2001 Brossard
6,522,312 B2 2/2003 Ohshima et al.
6,629,591 B1 10/2003 Griswold et al.
6,948,131 B1 9/2005 Neven et al.
7,661,676 B2 * 2/2010 Smith et al. ............... 273/149 R
2004/0224777 A1 * 11/2004 Smith et al. ..................... 463/47

FOREIGN PATENT DOCUMENTS

WO WO-0016863 A1 3/2000

OTHER PUBLICATIONS

"International Search Report for Application No. PCT/US2007/00375, date mailed Oct. 31, 2007", 4 pgs. .."Written Opinion of the International Searching Authority for Application No. PCT/US2007/00375, date mailed Oct. 31, 2007", 6 pgs.
"International Application Serial No. PCT/US2007/000375, International Preliminary Examination Report mailed Feb. 25, 2009", 8 pgs.
Bonanni, L., et al., "Counter Intelligence: Augmented Reality Kitchen", Extended Abstracts of Computer Human Interaction, CHI 2005, (2005), 7 pgs.

* cited by examiner

*Primary Examiner* — Masud Ahmed
(74) *Attorney, Agent, or Firm* — Schwegman, Lundberg & Woessner, P.A.

(57) ABSTRACT

Augmented reality wagering game systems and methods are described herein. In one embodiment, a computer-implemented method includes presenting a first set of markings on a wagering game table, where the first set of markings is associated with a basic wagering game. The method can also include detecting an event associated with the basic wagering game. In one embodiment, after detecting the event, the method calls for presenting a second set of markings on the wagering game table, where the second set of markings is associated with a bonus wagering game.

21 Claims, 11 Drawing Sheets

AUGMENTED REALITY WAGERING GAME SYSTEM

RELATED APPLICATION

This patent application is a U.S. National Stage Filing under 35 U.S.C. 371 from International Patent Application Serial No. PCT/US2007/000375, filed Jan. 5, 2007, and published on Jul. 19, 2007 as WO 2007/081856 A2 and republished as WO 2007/081856 A3, which claims the priority benefit of U.S. Provisional Patent Application Ser. No. 60/743,097 filed Jan. 5, 2006 and entitled "AUGMENTED REALITY WAGERING GAME SYSTEM", the contents of which are incorporated herein by reference in their entirety.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright 2005, 2006, WMS Gaming, Inc.

FIELD

This invention relates generally to the field of wagering games and more particularly to the field of augmented reality wagering game systems.

BACKGROUND

Modern casinos offer a wide variety of wagering game options, including numerous table games (e.g., blackjack, craps, etc.) and wagering games played on wagering game machines (e.g., slot machines, video poker machines, etc.). When the expectation of winning is similar (or believed to be similar), players often gravitate to the most entertaining and exciting wagering game options. One concept that has successfully enhanced entertainment in wagering game machines is "secondary" or "bonus" games played in conjunction with "basic" games. The basic game can be a typical wagering game such as video slots or video poker, while the bonus game can be completely different. Bonus games are often triggered by certain events or outcomes occurring in the basic game. Generally, bonus games provide a greater expectation of winning and include entertaining media presentations. As a result, wagering game machines may offer more appeal and excitement than other wagering game options.

BRIEF DESCRIPTION OF THE FIGURES

The present invention is illustrated by way of example and not limitation in the Figures of the accompanying drawings in which.

DESCRIPTION OF THE EMBODIMENTS

Augmented reality wagering game systems and methods are described herein. This description of the embodiments is divided into four sections. The first section provides an introduction to embodiments of the invention. The second section describes an example operating environment, while the third section describes example operations performed by some embodiments of the invention. The fourth section provides some general comments.

Introduction

This section introduces embodiments of a wagering game system that augments a playing environment with information about wagering games. In one embodiment, the wagering game system can present bonus games in association with basic table games, adding entertainment and excitement to table games that is otherwise associated with wagering game machines. For example, the system can detect events in a table game that trigger a bonus game. In turn, the system can present new table markings or virtual game pieces for use in the bonus game. After conclusion of the bonus game, the system resumes the basic table game.

Figure 1:
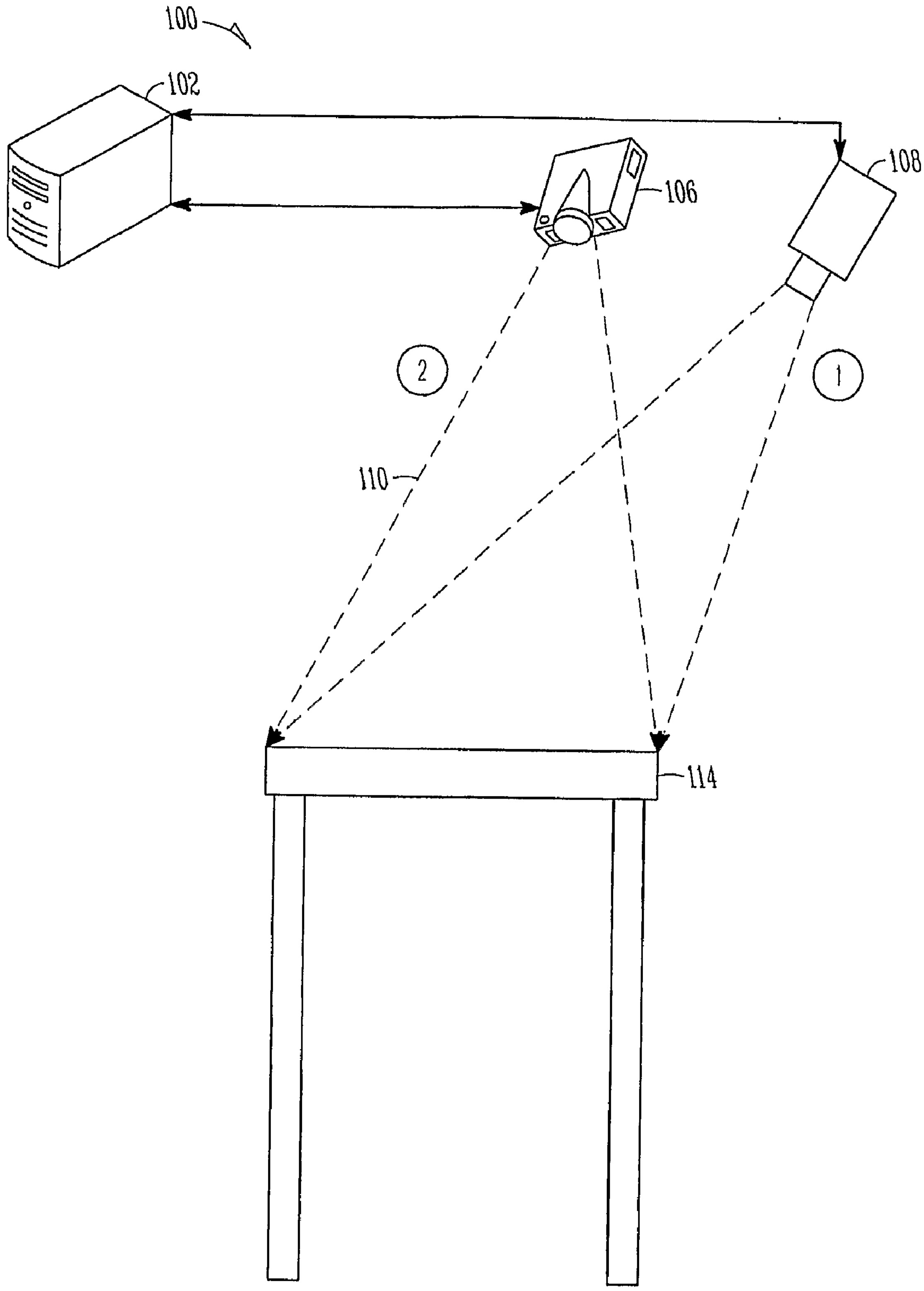
FIG. 1 is a diagrammatic illustration of a wagering game system for presenting wagering game information to players of a table wagering game, according to example embodiments of the invention.

In another embodiment, the wagering game system can detect events in a table game and present information informing players about those events. For example, the system can detect how much players have wagered on a table game and it can present, on the table, numerical representations of the wagers. As a result, the wagering game system makes it easier for players to glean information associated with table wagering games. FIG. 1 shows one embodiment of the wagering game system.

FIG. 1 is a diagrammatic illustration of a wagering game system for presenting wagering game information to players of a table wagering game, according to example embodiments of the invention. As shown in FIG. 1, the wagering game system 100 can include a camera 108 and projector 106 connected to a wagering game event processor 102.

In one embodiment, the wagering game system 100 operates in two stages. During stage one, the wagering game system uses the camera 108 to detect bonus game triggers occurring during wagering games on the wagering game table 114. For example, the wagering game system 100 can detect bonus game triggers, such as dealing of certain cards, movement of certain tangible game pieces, certain wagering game results, etc.

During stage two, the wagering game system 100 processes information representing the bonus game trigger and presents wagering game information associated with the events. For example, after detecting a bonus game trigger, the system 100 projects a bonus game setting (i.e., table markings associated with a bonus game) onto the table 114. Players can use the bonus game setting for playing a bonus game. Alternatively, the system 100 can present bonus game information on walls, overhead screens, or other places in the wagering game environment.

These and other features will be described in more detail below. The next section describes example gaming devices in more detail.

Example Operating Environment

Figure 2:
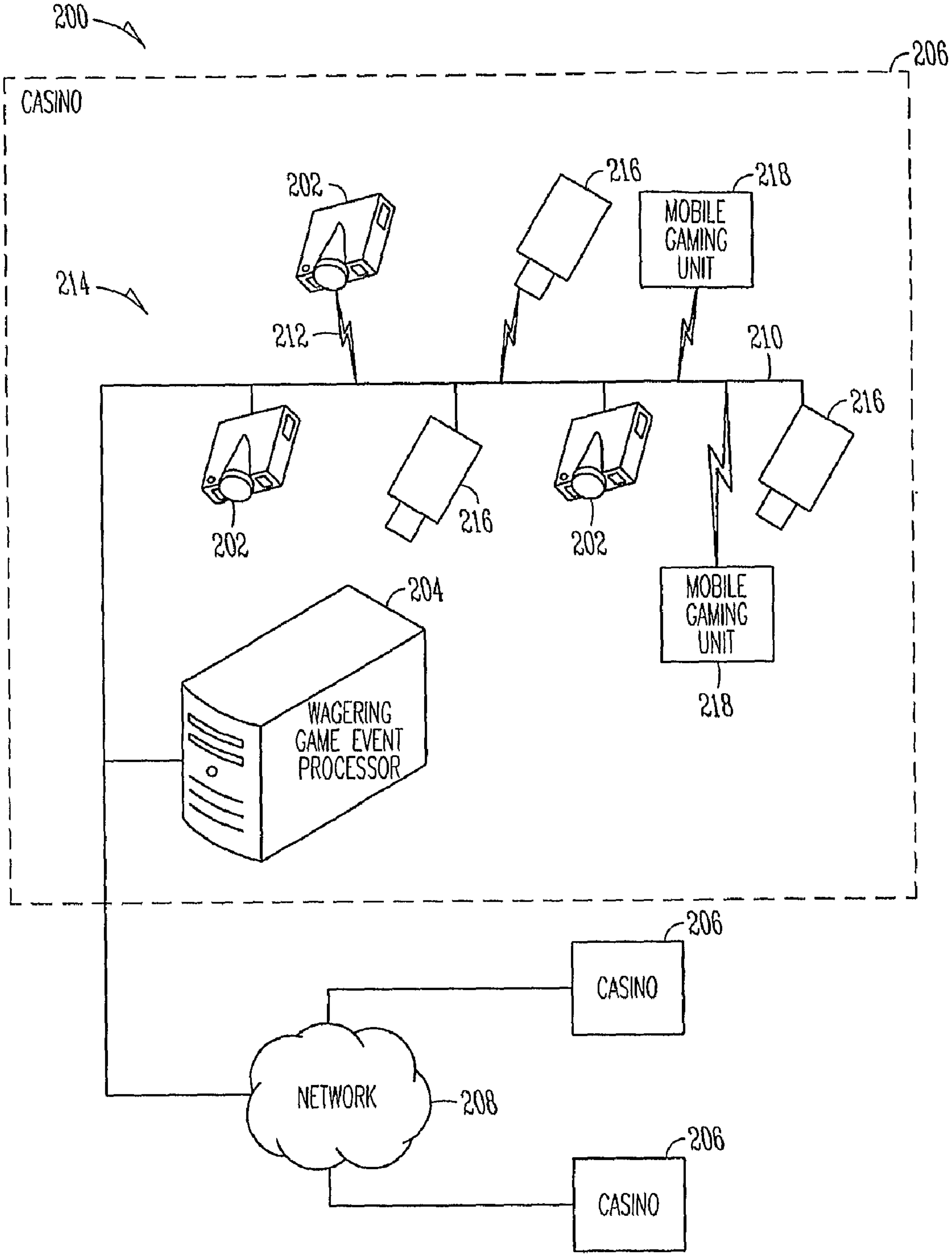
FIG. 2 is a block diagram illustrating a gaming network for augmenting a wagering game environment with wagering game information, according to example embodiments of the invention.

The section describes an example operating environment in which embodiments of the invention can be practiced. In particular, FIG. 2 presents an example network for augmenting wagering game environments with wagering game information, whereas FIG. 3 describes an example wagering game event processor. The discussion continues with FIG. 2.

FIG. 2 is a block diagram illustrating a gaming network for augmenting a wagering game environment with wagering game information, according to example embodiments of the invention. As shown in FIG. 2, the gaming network 200 includes a plurality of casinos 206 connected to a communications network 208.

Each of the plurality of casinos 206 includes a local area network (LAN) 214, which includes a plurality of event detectors 216, presentation units 202, and mobile gaming units 218 connected to a wagering game event processor 204. The event detectors 216 and presentation units 202 can be placed over one or more wagering game tables in the casinos 206.

In one embodiment, the event detectors 216 can include cameras, optical sensors, audio sensors, keypads, touch screens, radiofrequency transceivers, or other devices suitable for detecting events associated with a table wagering game. In one embodiment, the presentation units 202 can include projectors or other devices suitable for presenting wagering game information on a wagering game table. In one embodiment, the presentation unit 202 can be disposed inside a wagering game table, whereby the presentation unit 202 can present wagering game information on the table's playing surface or elsewhere in the playing environment.

The event detectors 216, presentation units 202, and wagering game event processor 204 can include hardware and machine-readable media including instructions for performing any of the operations described herein.

In one embodiment, the wagering game network 200 can include other network devices, such as accounting servers, wide area progressive servers, and/or other devices suitable for use in connection with embodiments of the invention. The components of each LAN 214 can communicate over wired 210 and wireless connections 212, as the LAN 214 can employ any suitable connection technology, such as Bluetooth, 802.11, Ethernet, public switched telephone networks, SONET, etc.

Figure 3:
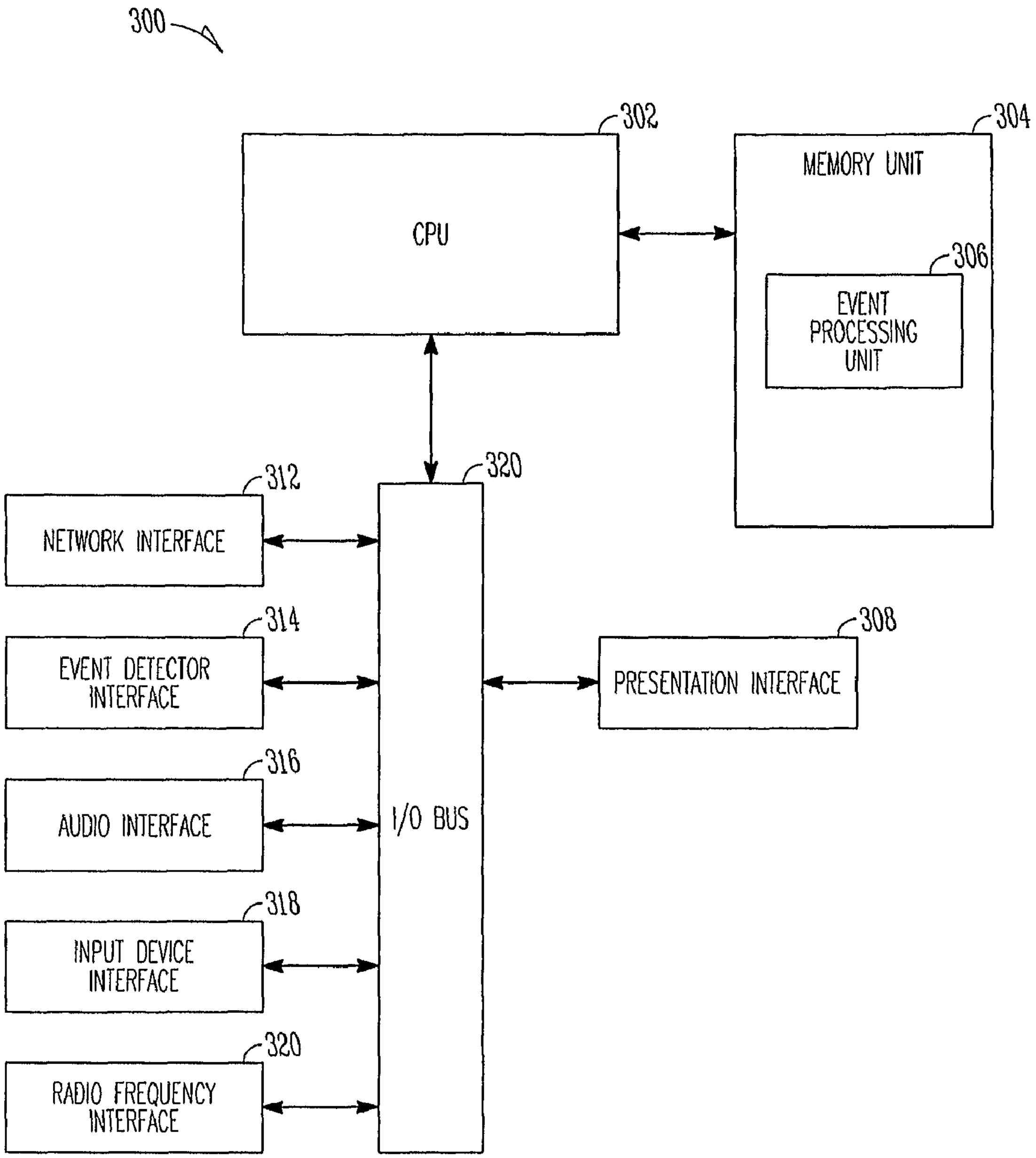
FIG. 3 is a block diagram illustrating a wagering game event processor, according to example embodiments of the invention.

While the discussion of FIG. 2 describes an example gaming network, FIG. 3 describes an example wagering game event processor. This description continues with a discussion of FIG. 3.

FIG. 3 is a block diagram illustrating a wagering game event processor, according to example embodiments of the invention. As shown in FIG. 3, the wagering game event processor 300 includes a central processing unit (CPU) 302 connected to a memory unit 304, which includes an event processing unit 306. The CPU 302 is also connected to an input/output (I/O) bus 320, which is connected to a presentation interface 308, event detector interface 314, audio interface 316, input device interface 318, network interface 312, and radiofrequency interface.

The event detector interface 314 can connect the wagering game event processor 300 to an event detector, such as a video capture device (e.g., camera), audio capture device (e.g., digital audio recorder), key pad, RF transceiver, or other device suitable for detecting events occurring in connection with a table wagering game. The event detector (not shown) can transmit information associated with events occurring on a wagering game table to the event processing unit 306. The event processing unit 306 can use the event information to determine that events have occurred. In one embodiment, depending on the event detectors 216, the event processing unit 306 can use techniques for computer vision, RF signal decoding, key pad decoding, etc., for analyzing the event information. The event processing unit 306 can use the event information to select wagering game information that is responsive to the events occurring at the wagering game table. The event processing unit 306 can transmit the wagering game information through the presentation interface 308 to a presentation unit (e.g., a projector) for display on a wagering game table. In one embodiment, the event processing unit 306 transmits wagering game information through the radiofrequency interface 320 for presentation in the wagering game environment.

In one embodiment, any of the components of the wagering game event processor can include machine-readable media including instructions for causing the CPU 302 to perform operations described herein. Machine-readable media includes any mechanism that provides (i.e., stores and/or transmits) information in a form readable by a machine (e.g., a computer). For example, tangible machine-readable media includes read only memory (ROM), random access memory (RAM), magnetic disk storage media, optical storage media, flash memory devices, etc.

Furthermore, components of the wagering game device 206 can include other logic (e.g., hardware, firmware, etc.) suitable for executing the operations described herein.

Operations

This section describes operations performed by embodiments of the invention. In the discussion below, the flow diagrams will be described with reference to the block diagrams presented above. In certain embodiments, the operations are performed by instructions residing on machine-readable media (e.g., software), while in other embodiments, the operations are performed by hardware and/or other logic (e.g., firmware).

FIGS. 4-10 are discussed below. FIGS. 4-8 describe operations for presenting basic and bonus wagering games on wagering game tables, while FIGS. 9-11 describe operations for presenting wagering game information. This description will proceed with a discussion of FIG. 4.

Figure 4:
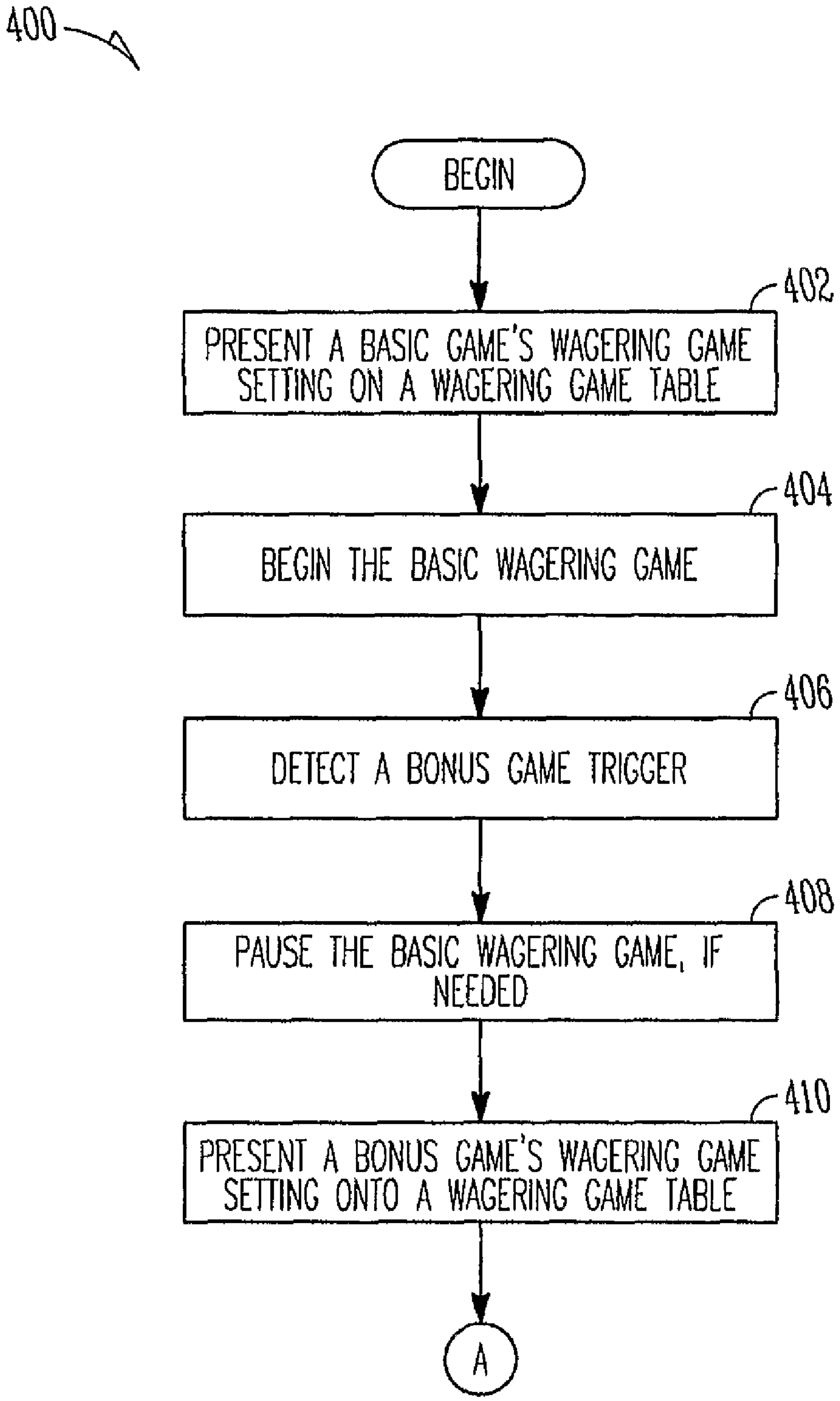
FIG. 4 is a flow diagram illustrating operations for presenting basic and bonus wagering games, according to example embodiments of the invention.

FIG. 4 is a flow diagram illustrating operations for presenting basic and bonus wagering games, according to example embodiments of the invention. The flow diagram 400 begins at block 402.

Figure 5:
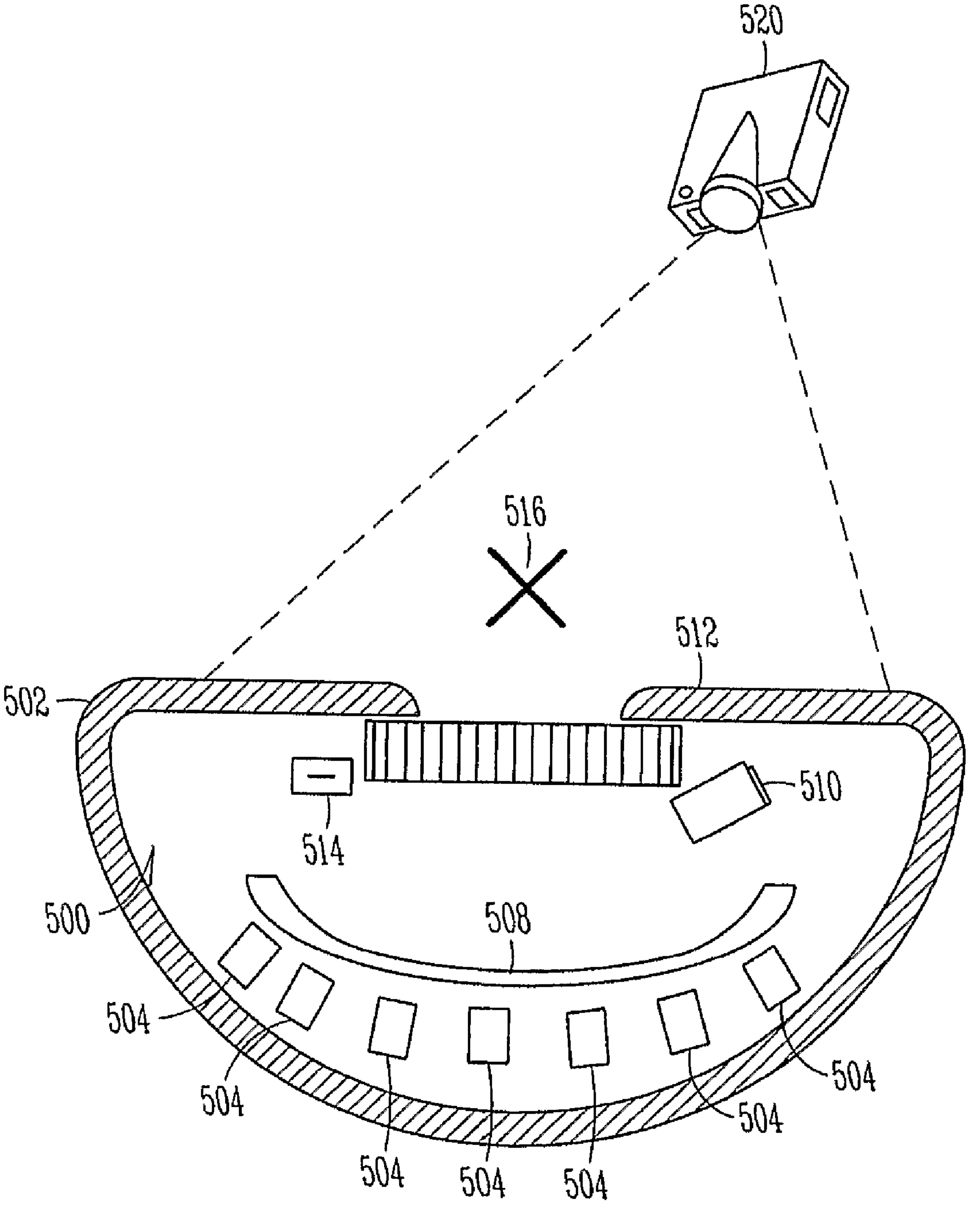
FIG. 5 is a perspective view of a wagering game setting presented on a wagering game table, according to example embodiments of the invention.
Figure 6:
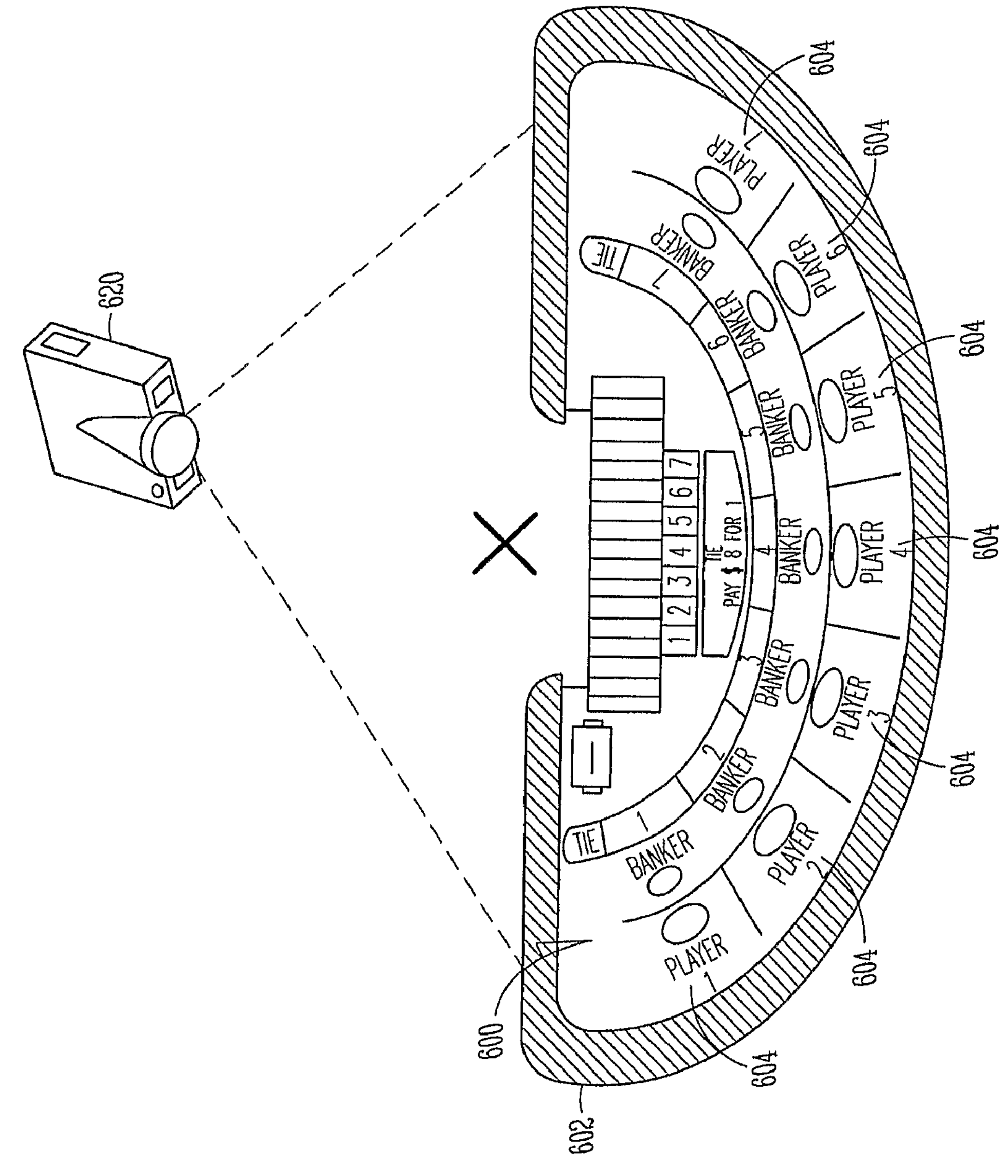
FIG. 6 is a perspective view of yet another wagering game setting presented on a wagering game table, according to example embodiments of the invention.

At block 402, a basic game's wagering game setting is presented on a wagering game table. For example, the wagering game event processor's event processing unit 306 transmits wagering game setting information through the presentation interface 308 to a presentation unit 202. In turn, the presentation unit 202 uses the wagering game setting information to present a basic game's wagering game setting on a wagering game table. FIGS. 5 and 6 illustrate this in greater detail.

FIG. 5 is a perspective view of a wagering game setting presented on a wagering game table, according to example embodiments of the invention. FIG. 5 shows a presentation unit 520 projecting a wagering game setting 500 onto a wagering game table 502. In FIG. 5, the wagering game setting 500 is a blackjack setting, as the wagering game setting 500 includes table markings for conducting blackjack games on the wagering game table 502. In one embodiment the wagering game setting 500 is used for basic games, while other settings are used for bonus games (see FIG. 7).

As shown in FIG. 5, the markings include player stations 504 and a wagering line 508. The basic game can use the wagering game setting 500 in concert with tangible game pieces, such as wagering tokens (a.k.a. chips), playing cards, a card shoe 510, a cash receptacle 514, and wagering token storage 512. A dealer, standing in the dealer's position 516, can conduct blackjack games using the projected markings and the tangible game pieces.

In another embodiment, the presentation unit 520 can be a liquid crystal display (LCD) mounted inside the wagering game table 502, where the LCD display presents the bonus game setting on the table's playing surface. Other embodiments can use other display devices suitable for presenting the wagering game setting 500 on the playing surface of the wagering game table 502 (e.g., an organic light emitting diode display or other direct view display).

While FIG. 5 shows a blackjack game setting, FIG. 6 shows a different game setting. FIG. 6 is a perspective view of yet another wagering game setting presented on a wagering game table, according to example embodiments of the invention. In FIG. 6, a presentation unit 620 is projecting a baccarat game setting 600 onto a wagering game table 602. The baccarat game setting 600 includes a plurality of player stations 604 and other markings. The wagering game setting 602 can be used with tangible game pieces, such as playing cards, wagering tokens, etc.

The discussion will now turn back to FIG. 4's flow diagram 400.

At block 404, a basic wagering game begins. For example, players begin playing the basic wagering game, such as blackjack or baccarat, at a wagering game table. The players play the wagering game using the wagering game setting and tangible game pieces, such as playing cards and wagering tokens. The flow continues at block 406.

At block 406, a bonus game trigger is detected. For example, an event detector 216 detects a bonus game triggering event. In one embodiment, the bonus game trigger can be certain cards being dealt on the wagering game table, certain wagers being placed on the wagering game table, or certain wagering game results. In another embodiment, the bonus game trigger can include a dealer entering data on a keypad. Alternatively, the bonus game trigger can be any event that is detectable by an event detector 216. The flow continues at block 408.

At block 408, if needed, the basic wagering game is paused. For example, if needed, the event processing unit 306 stores the basic game's wagering game setting, thus pausing the basic wagering game. If the bonus game is triggered at the conclusion of a basic game, there may be no need to pause the basic wagering game. The flow continues at block 410.

Figure 7:
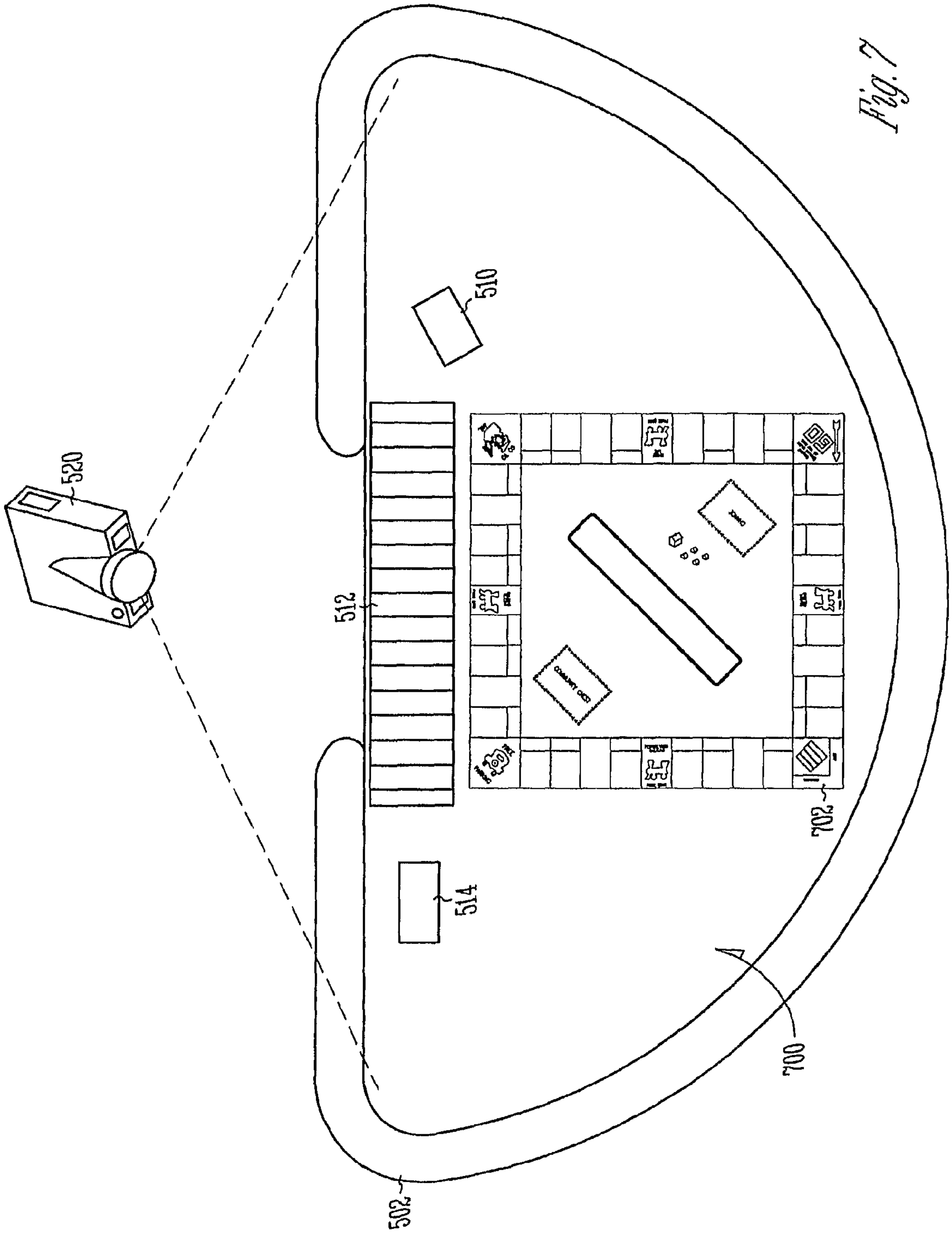
FIG. 7 is a perspective view of a bonus game setting presented on a wagering game table, according to example embodiments of the invention.

At block 410, a bonus game's wagering game setting is presented on the wagering game table. For example, the presentation unit 202 projects a bonus game setting onto a wagering game table. FIG. 7 shows an example of one such bonus game setting. The description will continue with a discussion of FIG. 7.

FIG. 7 is a perspective view of a bonus game setting presented on a wagering game table, according to example embodiments of the invention. In FIG. 7, the presentation unit 520 has replaced the wagering game setting 500 (see FIG. 5) with a bonus game setting 700. Although the bonus game setting 700 has replaced the wagering game setting 500, some or all of the tangible items can remain.

The bonus game setting 700 includes a game board 702, which can be used for conducting Monopoly®-style bonus games in which players roll tangible dice and move tangible game pieces around a game board 702. In one embodiment, players can place wagers on the bonus games. The discussion will now turn back to block 410 of FIG. 4.

Figure 8:
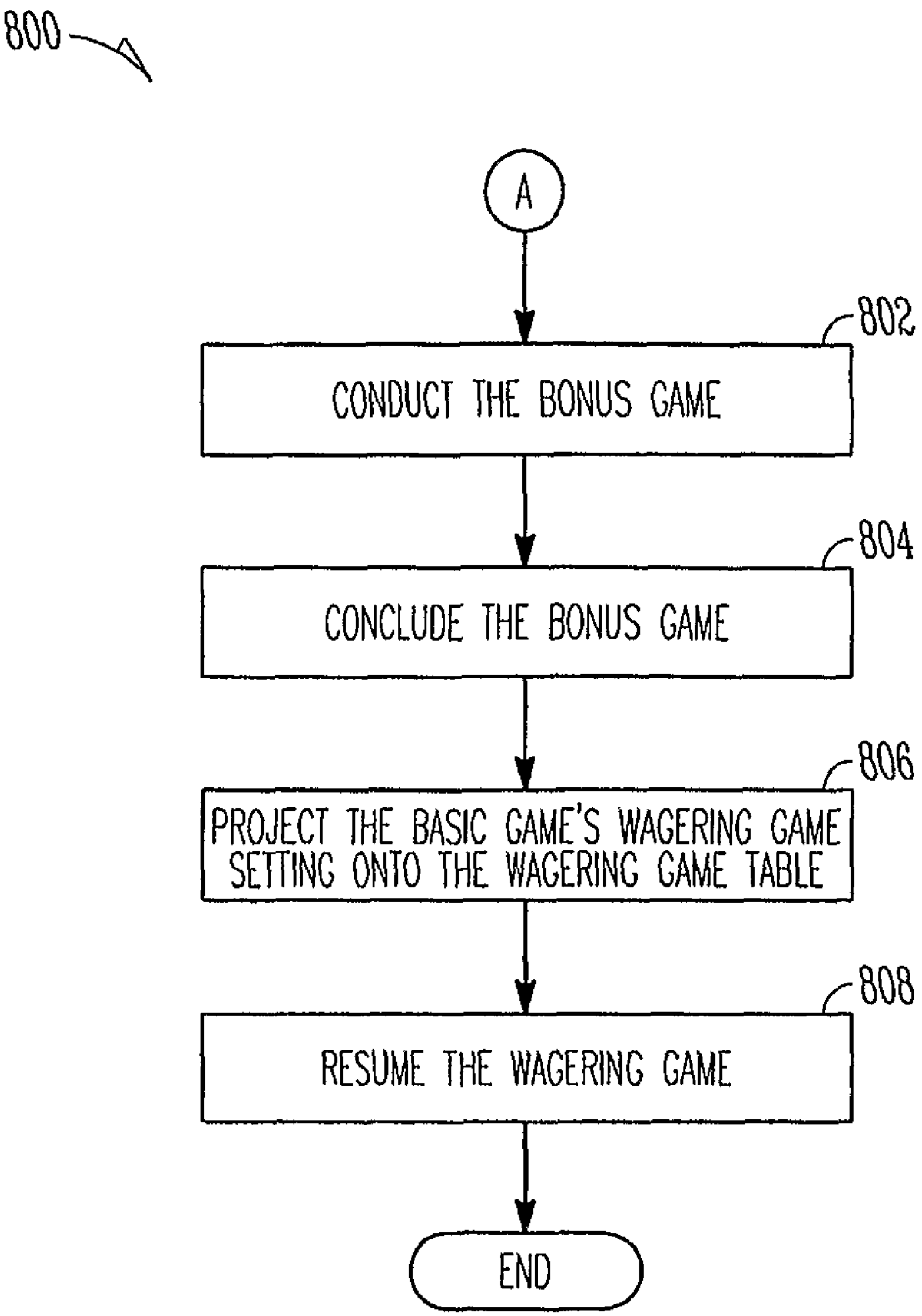
FIG. 8 is a flow diagram illustrating additional operations for presenting basic and bonus wagering games, according to example embodiments of the invention.

From block 410, the flow 400 moves to block 802 of FIG. 8. Therefore, this description will continue with FIG. 8.

FIG. 8 is a flow diagram illustrating additional operations for presenting basic and bonus wagering games, according to example embodiments of the invention. The flow diagram 800 continues from block 410 of the flow diagram 400 of FIG. 4.

At block 802, the bonus game is conducted. During the bonus game, players can place wagers and move tangible game pieces. In one embodiment, the event processing unit 306 presents additional features of the bonus setting 700 in response to events of the bonus game. The flow continues at block 804.

At block 804, the bonus game is concluded. For example, the event detector 216 detects events that conclude the bonus game. As a result, the event processing unit 306 may present final features (e.g., video content) of the bonus game setting 700. At the conclusion of the bonus game, the dealer (not shown) can pay bonus game wagers and collect tangible game pieces associated with the bonus game. The flow continues at block 806.

At block 806, the basic game's wagering game setting is projected onto the wagering game table. For example, the presentation unit 202 projects the basic game's wagering game setting onto the wagering game table. The flow continues at block 808.

At block 808, the basic wagering game is resumed. For example, the event processing unit 306 resumes detecting events and presenting setting features associated with the basic wagering game. Form block 808, the flow ends.

Figure 9:
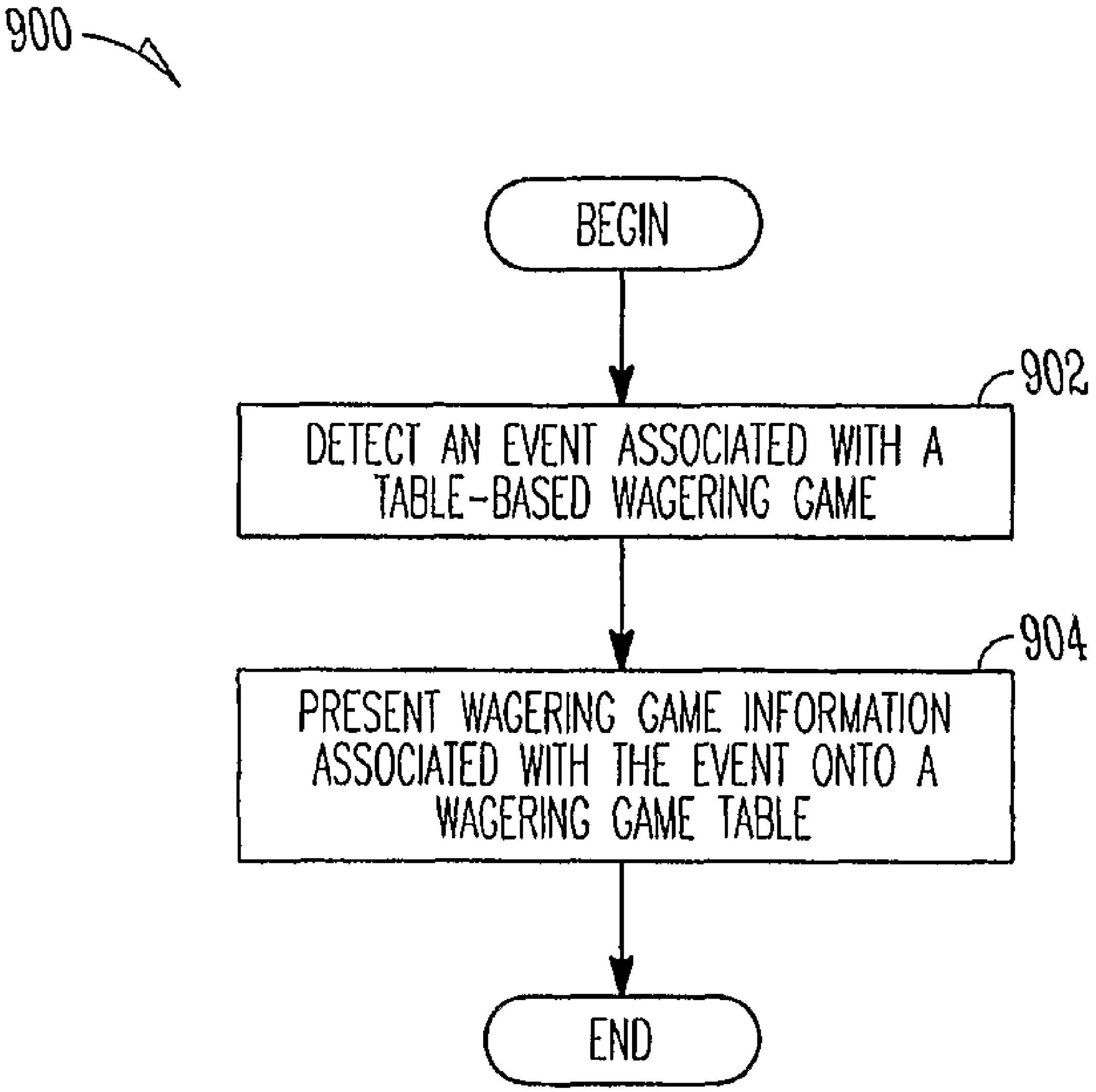
FIG. 9 is a flow diagram illustrating operations for presenting wagering game information in a wagering game environment, according to example embodiments of the invention.
Figure 10:
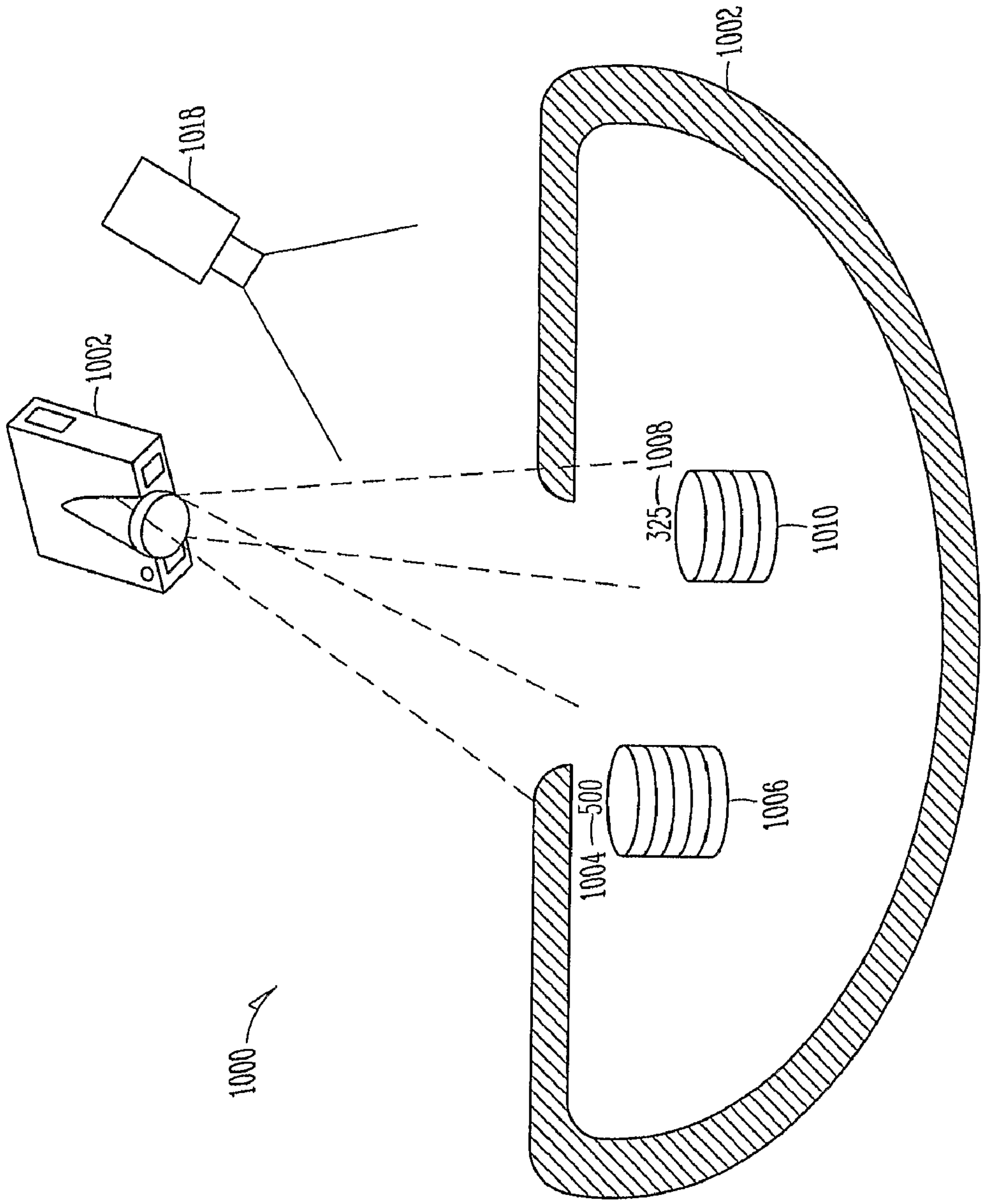
FIG. 10 is a perspective view of a wagering game table on which wagering game information has been presented in response to wagering game events, according to example embodiments of the invention.
Figure 11:
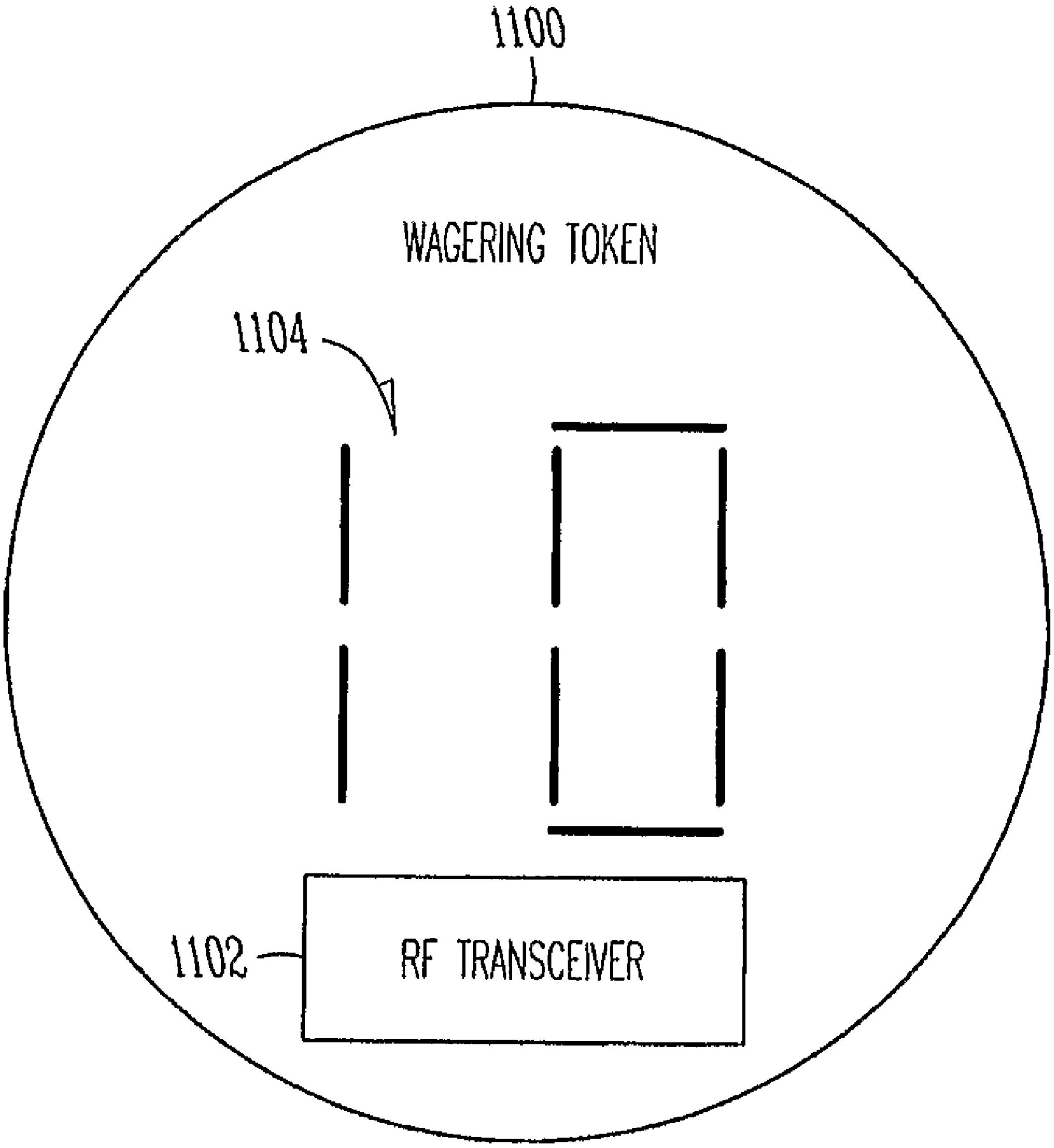
FIG. 11 is a block diagram of a wagering game token operable to receive and present wagering game information, according to embodiments of the invention.

While FIGS. 4-8 describe operations for presenting basic and bonus wagering game, FIGS. 9-11 describe operations for presenting wagering game information in a wagering game environment. This description continues with a discussion of FIG. 9.

FIG. 9 is a flow diagram illustrating operations for presenting wagering game information in a wagering game environment, according to example embodiments of the invention. The flow diagram 900 commences at block 902.

At block 902, an event associated with a table-based wagering game is detected. For example, an event detector 216 detects an event associated with a table-based wagering game, such as blackjack, poker, baccarat, etc. In one embodiment, the event occurs when players place wagers by placing wagering tokens on a wagering game table. Alternatively, the event can occur upon dealing certain cards, movement of tangible game pieces, player/dealer hand gesturing, or other events detectable by an event detector 216. FIG. 10 helps to illustrate this concept.

FIG. 10 is a perspective view of a wagering game table on which wagering game information has been presented in response to wagering game events, according to example embodiments of the invention. As shown in FIG. 10, an event detector 1018 detects placement of wagering tokens 1006 and 1010 on a wagering game table 1002. Turning back to FIG. 9, the flow 900 continues at block 904.

At block 904, wagering game information associated with the event is presented on the wagering game table. For example, a presentation unit 202 presents wagering game information on the wagering game table. Alternatively, the presentation unit 202 can present the wagering game information elsewhere, such as on tangible game pieces, walls, floors, ceilings, signs, etc. Again, FIG. 10 helps illustrate this concept. In FIG. 10, the presentation unit 1002 projects numerical wager indicators on the wagering game table 1002. That is, the presentation unit 202 projects “500” to represent a wager amount associated with the wagering tokens 1006 and “325” to represent a wager amount association with the wagering tokens 1010.

In another embodiment, the wagering game system 200 transmits the wagering game information to tangible game pieces, which then present the wagering game information on their own display devices. For example, in one embodiment, the event detector includes a radiofrequency (RF) transceiver, while the tangible game pieces include RF transceivers and LCDs. FIG. 11 illustrates one such tangible game piece.

FIG. 11 is a block diagram of a wagering game token operable to receive and present wagering game information, according to embodiments of the invention. As shown in FIG. 11, a wagering token 1100 includes an RF transceiver 1102 and LCD 1104. The wagering token 1100 include other means for receiving and presenting information. For example, the wagering game token 1100 can include an 802.11 transceiver and any suitable display device.

In one embodiment, the RF transceiver 1102 transmits an RF signal to the wagering game system’s event detector 216. Based on the signal, the event detector 216 can determine that a player has wagered the wagering token 1100 and it can determine the token’s monetary value. If a player wagers several wagering tokens 1100, the event processing unit 306 can determine the wager value using signals from each token. After determining the wager value, the presentation unit transmits wagering game information to the wagering token 1100, where the wagering game information indicates a numerical representation of the wager value. The wagering token 1100 can present the numerical representation of the wager on its LCD 1104.

In yet another embodiment, an RE transmitter can be adapted for carrying on a player’s person. The RF transmitter can transmit certain player information, such as a player’s name, favorite games, betting habits, etc., to event detectors in a casino. If a player steps-up to a wagering game table, a presentation unit 202 can present the player’s name and other information on the wagering game table’s playing surface. Additionally, the presentation unit 202 can transmit player information to a console visible only to the dealer or other casino personnel. Such an RF transmitter can be used in other parts of the casino, including a hotel or restaurant. As a player moves through the casino, casino personnel can provide personalized services based on the player’s personal information.

In another embodiment, the system can also guide players to points of interest in a casino 206. For example, the system can guide players to their favorite wagering game machines, wagering game tables, restaurants, bath rooms, etc. In such an embodiment, the mobile gaming units 218 can transmit RF signals (or other communications) for receipt by the event detectors 216, which can use the RF signals to track player movements in a casino 206 (e.g., by triangulation, signal strength, etc.). As players move through the casino 206, the presentation units 202 can direct players to points of interest. For example, the presentation units 202 can project arrows and text onto the casino floor, or other tangible objects, indicating paths to various points of interest. Alternatively, the presentation units 202 can transmit signals that illicit the mobile gaming units 218 to direct players via graphics and/or text.

General

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to “one embodiment” or “an embodiment” mean that the feature being referred to is included in at least one embodiment of the invention. Further, separate references to “one embodiment” in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description.

Herein, block diagrams illustrate example embodiments of the invention. Also herein, flow diagrams illustrate operations of the example embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, although the flow diagrams depict serial operations, certain embodiments could perform certain of those operations in parallel.

The invention claimed is:

1. A method for augmenting a game play experience at a wagering game table including a physical table surface and tangible game pieces played on the physical table surface, the method comprising:

projecting, via a presentation unit, a first set of markings onto the table surface, the first set of markings used in combination with at least a first tangible game piece for game play of a live-action wagering table game;

detecting, via an event detector, an event occurring in the table game, wherein the event is caused by an autonomous game participant;

recognizing the event, via an event processing unit, as one of a plurality of pre-defined events associated with the table game, wherein one or more of the pre-defined events are bonus-triggering events;

after detecting the event, and if the detected event is recognized to be a bonus-triggering event, projecting, via the presentation unit, a second set of markings to replace the first set of markings on the table surface, and the second set of markings used in combination with at least a second tangible game piece for game play of a bonus wagering game, and wherein input from the game participant during the bonus wagering game is detected and, if recognized as one of the plurality of pre-defined events, sent back to the presentation unit for further presentation.

2. The method of claim 1, further comprising:

detecting wagers placed on the bonus wagering game.

3. The method of claim 1, wherein the first and second sets of markings are presented using a projector that is spaced apart from the wagering game table.

4. The method of claim 1, further comprising, after detecting the event, and if the detected event is not recognized to be a bonus-triggering event, allowing the live-action table game to continue without augmentation.

5. The method of claim 1, wherein the live-action table game is selected from the group consisting of poker, black jack, and baccarat.

6. A gaming system comprising:

at least one presentation unit;

at least one event detector;

at least one event processing unit operating with the at least one presentation unit and the at least one event detector to:

detect an event occurring in a wagering game, the wagering game being conducted by autonomous game participants using tangible game pieces and a physical game table, wherein the event is caused by at least one of the autonomous game participants and is associated with the tangible game pieces;

using the at least one presentation unit, project one or more images on the game table in response to the detected event, wherein the one or more images are used in combination with the tangible game pieces for game play; and continue the wagering game as augmented by the one or more projected images, wherein another event caused by at least one of the autonomous game participants during the continued wagering game is detected and sent back to the at least one presentation unit for further presentation.

7. The gaming system of claim 6, wherein the at least one presentation unit comprising a projector that is spaced apart from the physical game table.

8. The gaming system of claim 6, wherein the at least one presentation unit presents an image including a numerical representation of a wager, detected via the at least one event detector, onto the physical game table.

9. The gaming system of claim 6, wherein an image including a numerical representation of a wager, detected via the at least one event processor, is presented on at least one of the tangible game pieces.

10. The gaming system of claim 9, wherein the at least one of the tangible game pieces is a casino token.

11. The gaming system of claim 6, wherein the wagering game is selected from the group consisting of poker, black jack, and baccarat.

12. The gaming system of claim 6, wherein the tangible game pieces include playing cards.

13. A gaming system for augmenting game play of a wagering table game that is controlled independently from the gaming system, the wagering table game including a physical table surface and tangible game pieces played on the physical table surface, the system comprising:

at least one event detector operable to detect an event occurring proximal to the table surface, wherein the detected event is caused by an autonomous table game participant;

at least one event processing unit;

at least one presentation unit operable to project images of a plurality of supporting game elements onto the table surface, wherein the images are used in combination with the tangible game pieces for the game play;

at least one memory device having a plurality of stored instructions which, when executed by the at least one event processing unit, cause the at least one event processing unit to operate with the at least one event detector and the at least one presentation unit to:

recognize the detected event as one of a plurality of pre-defined events associated with the table game;

interpret the detected event in accordance with the plurality of stored instructions; and in response to the detected event, project one or more of the images of the plurality of game elements onto the table surface to be used for the game play, and wherein input from the game participant during the game play is recognized, interpreted, and sent back to the presentation unit for further presentation, as determined by one or more of the stored instructions.

14. The gaming system of claim 13, further comprising:

a radio frequency transceiver operable to receive wagering table game information; and a display operable for presenting the wagering table game information.

15. The gaming system of claim 13, wherein the at least one event detector is an optical device.

16. The gaming system of claim 13, wherein the at least one presentation unit is separate from and spaced apart from the physical table surface on which the images are projected.

17. The gaming system of claim 13, wherein the projected images are integrated with non-projected images on the physical table surface such that both the projected and non-projected images are used for the game play.

18. The gaming system of claim 13, wherein the at least one event detector includes a radiofrequency receiver operable to receive signals from one or more tangible game pieces used in the wagering table game.

19. The gaming system of claim 13, wherein the at least one presentation unit is further operable to present game information transmitted from the one or more tangible game pieces.

20. The gaming system of claim 6, wherein the at least one event processing unit detects a wager associated with the wagering game by detecting one or more physical wagering tokens on the physical game table.

21. The gaming system of claim 20, wherein the at least one event processing unit is further operable to determine a total value of the one or more physical wagering tokens for a player and project the total value on the physical game table on or near the physical wagering tokens.

* * * * *

UNITED STATES PATENT AND TRADEMARK OFFICE

CERTIFICATE OF CORRECTION

PATENT NO. : 8,002,619 B2
APPLICATION NO. : 12/160188
DATED : August 23, 2011
INVENTOR(S) : Mark B. Gagner et al.

It is certified that error appears in the above-identified patent and that said Letters Patent is hereby corrected as shown below:

In column 4, lines 49-51, delete "Furthermore, components of the wagering game device 206 can include other logic (e.g., hardware, firmware, etc.) suitable for executing the operations described herein." and
insert -- Furthermore, components of the wagering game device can include other logic (e.g., hardware, firmware, etc.) suitable for executing the operations described herein. --, on Col. 4, Line 48, after "etc." as a continuation of the same paragraph.

In column 7, line 57, delete "RE" and insert -- RF --, therefor.

Signed and Sealed this
Eighteenth Day of October, 2011

David J. Kappos
*Director of the United States Patent and Trademark Office*